(No Model.)
A. DE C. COLES.
STOVE LID LIFTER.
No. 593,196.  Patented Nov. 9, 1897.
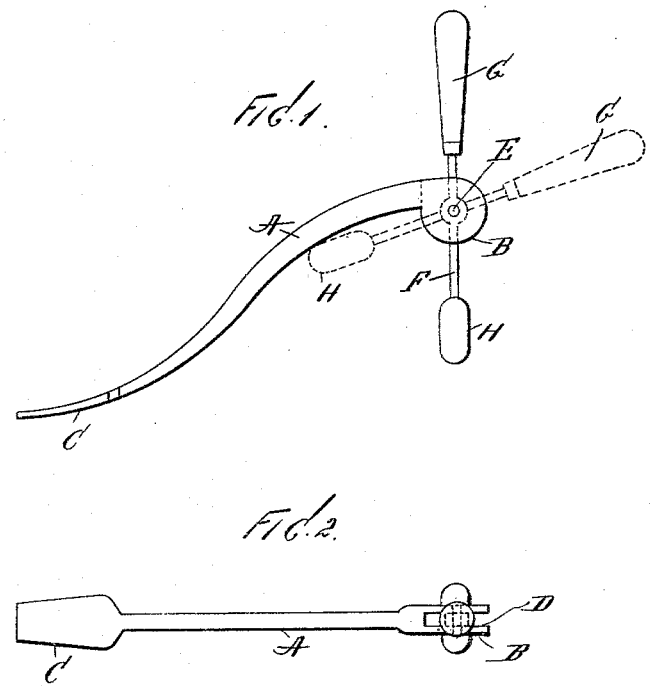
WITNESSES
John Buckler
C. Gersh
INVENTOR
Albert De C. Coles
BY Edgar Tate &c
ATTORNEYS

UNITED STATES PATENT OFFICE.

ALBERT DE CAMP COLES, OF NEWARK, NEW JERSEY, ASSIGNOR OF ONE-FOURTH TO JOHN LEWIS HAY, OF CLINTON, NEW JERSEY.

STOVE-LID LIFTER.

SPECIFICATION forming part of Letters Patent No. 593,196, dated November 9, 1897.

Application filed March 22, 1897. Serial No. 628,669. (No model.)

*To all whom it may concern:*

Be it known that I, ALBERT DE CAMP COLES, a citizen of the United States, residing at Newark, in the county of Essex and State of New Jersey, have invented certain new and useful Improvements in Stove-Lid Lifters, of which the following is a full and complete specification, such as will enable those skilled in the art to which it appertains to make and use the same.

This invention relates to stove-lid lifters; and the object thereof is to provide a device of this class with an improved handle which cannot become overheated.

The invention is fully disclosed in the following specification, of which the accompanying drawings form a part, in which—

Figure 1 is a side view of my improved stove-lid lifter, and Fig. 2 a plan view thereof.

In the drawings forming part of this specification the separate parts of my improvement are designated by letters of reference in each of the views, and in the practice of my invention I provide a lever A, which constitutes the main part of the lifter, and which is provided at one end with a circular head B, and the lever A is curved downwardly and outwardly and is preferably provided at the end thereof with a flat head C, by means of which a stove-lid may be lifted in the usual manner.

The circular head B of the lever A is provided with a vertical slot D, in which is pivoted at E a rod F, which is provided at one end with a handle G, which may be composed of wood or any suitable material, and at the opposite end with a cross-head H, which is preferably composed of metal, but which may be composed of any desired material, and the rod F may be composed of wood, if preferred.

The handle G constitutes the handle of the lifter, and the rod F is free to swing on its pivotal support at E, and the operation will be readily understood from the foregoing description when taken in connection with the accompanying drawings and the following statement thereof.

In practice the handle G is grasped in one hand, and in this operation said handle is turned into the position shown in dotted lines in Fig. 1, and the cross-head H strikes the under side of the lever A and serves as a fulcrum for said lever, and the stove-lid is lifted and manipulated by the end C thereof.

This device is simple in construction and operation and is perfectly adapted to accomplish the result for which it is intended, and it will be understood that all the parts thereof, except the lever A, which is necessarily composed of metal, may be constructed of any desired material.

Having fully described my invention, I claim as new and desire to secure by Letters Patent—

1. A stove-lid lifter consisting of a lever which is provided at one end with a head in which is formed a vertical slot, and a rod which is pivoted in said slot, and provided at one end with a handle, and at the other with a cross-head which is adapted to bear on said lever, substantially as shown and described.

2. In a stove-lid lifter, the combination with a curved lever as A, which is provided at one end with a head as B, in which is formed a vertical slot as D, of a rod as F, which is pivoted in said slot, and which is provided at one end with a handle as G, and at the other with a head which is adapted to bear on the under side of said lever, substantially as shown and described.

In testimony that I claim the foregoing as my invention I have signed my name, in presence of the subscribing witnesses, this 19th day of March, 1897.

ALBERT DE CAMP COLES.

Witnesses:
C. GERST,
J. SAUER.